United States Patent Office 2,744,084
Patented May 1, 1956

2,744,084

OLEFIN POLYMERIZATION PROCESS USING HYDROGENATED NAPHTHA SOLVENT

William F. Arey, Jr., Baton Rouge, La., assignor to Esso Research and Engineering Company, a corporation of Delaware No Drawing. Application September 26, 1952,
Serial No. 311,811

8 Claims. (Cl. 260—33.6)

This invention relates to an improved process for making high molecular weight polymers in the presence of a suitable solvent in which the resulting polymers are at least substantially soluble. More particularly, it relates to the manufacture of a high molecular weight synthetic rubbery copolymer of a major proportion of an alkene and a minor proportion of a conjugated diene, by low temperature Friedel-Crafts polymerization, in the presence of a new and improved solvent for the resulting high molecular weight polymers.

It is known, as disclosed in U. S. Patent 2,356,128 that high molecular weight synthetic rubber can be made by copolymerizing isobutylene and a diolefin such as isoprene or butadiene at temperatures below 0° C. with a dissolved Friedel-Crafts catalyst such as aluminum chloride dissolved in methyl chloride. This process has been carried out commercially for instance by polymerizing 97% of isobutylene with 2 or 3% of isoprene at —103° C., in the presence of 2 or 3 volumes of methyl chloride per volume of reactants. The resultant copolymer has a high molecular weight, generally about 20,000 to 150,000, Staudinger, and usually about 30,000 to 100,000, with a relatively low chemical unsaturation, as indicated by an iodine number in the range of about 1 to 50, usually about 1 to 10. Although the reactants, isobutylene and isoprene, are soluble in the methyl chloride diluent, the resultant polymer is insoluble in the methyl chloride, and generally takes the form of fine particles suspended as a slurry in the liquid methyl chloride, together with any unreacted reactants and the residual catalyst solution. This entire reaction mixture is then generally poured into hot water, preferably containing a small amount of zinc stearate, whereupon the methyl chloride (which boils at —23° C.) is flashed off along with any unreacted isobutylene and isoprene, which likewise are low boiling. The resultant slurry of insoluble rubbery polymer particles suspended in water is then separated from most of the water by passing through a vibrating screen or collecting on a rotary filter, and finally passing through a drier to remove residual water.

Several features about the above described prior art process are relatively expensive and time-consuming. For instance, when the methyl chloride diluent is flashed off as a vapor, it must then be recondensed and cooled down to the reaction temperature of —103° C. It would be desirable, by heat exchangers, to use the cold reaction liquid to remove some heat from incoming reactants before flashing the reaction liquid into hot water, but this cannot be done when methyl chloride is used as diluent, because the insoluble polymer precipitates on the heat exchanger surfaces.

There have been attempts heretofore to carry out this polymerization in the presence of a liquefied hydrocarbon such as butane in which the resultant polymer would actually be soluble, and therefore stay dissolved. The advantage of such a solution process is the lower refrigeration cost made possible by heat exchanging the reactor effluent with incoming reactor feed.

However, it is found that butanes, and even pentanes, are not sufficiently good solvents for the high molecular weight isobutylene-diolefin synthetic rubber, and the excessive precipitation of the polymer interferes with a practical operation of such a solution process. On the other hand, higher paraffinic hydrocarbons such as pure normal hexane and normal heptane are too expensive and difficult to obtain commercially in large enough volume to permit use in such a solution process for manufacturing this synthetic rubber. Attempts have also been made to use commercially available mixtures of petroleum hydrocarbons ranging from 6 to 8 carbon atoms such as present in petroleum naphthas, and these are found to have appropriate solvent properties for the synthetic rubber polymer, but contain some materials which poison the polymerization reaction and result in undesirably low molecular weight polymer.

According to the present invention, these difficulties are solved by hydrogenating a petroleum hydrocarbon naphtha fraction consisting essentially of compounds having from 5 to 10, preferably 6 to 7 or 8 carbon atoms. Although it is possible to use wide-boiling fractions such as a gasoline type fraction boiling from about 100–400° F., it is preferable to use a narrower cut, e. g. 150–350° F., 200–300° F., 200–250° F. or 150–200° F. or even narrower such as 200–225° F. or 225–250° F.

This naphtha fraction to be used, should preferably consist mostly, i. e. at least about 85% or more, of aliphatic and naphthenic hydrocarbons, and preferably should contain less than about 15% of aromatic hydrocarbon such as benzene, toluene and their homologues. Although the naphtha fraction can contain any amount of aromatic and olefinic hydrocarbons, it is generally preferable to use a naphtha of low aromatic and olefin content. Under hydrogenation conditions, aromatic and olefinic hydrocarbons give rise to a relatively large hydrogen consumption which adds to the cost of the hydrogenation process. Straight run, virgin naphthas normally meet the requirements of the above specified preferred naphtha.

The hydrogenation of such a naphtha may then be carried out by any of the known hydrogenation methods, but it is preferably a non-destructive hydrogenation intended primarily to chemically saturate at least some of the aromatic and olefinic compounds present, and to remove or inactivate whatever other materials, e. g. perhaps traces of compounds containing sulfur, nitrogen or oxygen, are present in the naphtha which tend to poison the polymerization of the synthetic rubber reactants. The hydrogenation may suitably be carried out at a temperature of about 100 to 600° F., preferably about 200–500° F. and under a pressure (p. s. i. g.) of about 100 to 5,000, preferably about 200 to 1,000. This is a non-destructive hydrogenation, and makes only an insignificant change, if any, in boiling point of the naphtha. Various hydrogenation catalysts may be used such as nickel, reduced nickel, Raney chemical, molybdenum sulfide or oxide and the like, either alone or on a granular support having a large surface area such as charcoal, silica gel, alumina gel, etc. The hydrogenation reaction time may vary, of course, according to the temperature and pressure used and the catalyst used, and may range from a fraction of an hour to a day or longer, but preferably is within the range of about 1 to 10 hours.

After the hydrogenation is completed to the desired extent, which may be judged by bromine number, refractive index and specific dispersion, the hydrogenated naphtha may be filtered or distilled to remove any trace of catalyst, if desired, and is then ready for use as solvent in the synthetic rubber polymerization process.

The resulting hydrogenated naphtha will then have values for the physical properties listed within the following approximate ranges:

|  | General Range | Preferred Range |
|---|---|---|
| Gravity, °API | 50–75 | 60–72 |
| Refractive Index | <1.4130 | <1.4100 |
| Specific Dispersion | <100 | <97.5 |
| Bromine Number | 0 | 0 |

The hydrogenated naphtha thus prepared may, according to the invention, now be used both as diluent for the reactants, as well as solvent for the catalyst for the low temperature polymerization to make high molecular weight polymers of isobutylene alone or together with small amount of diolefin such as isoprene or butadiene.

As the Friedel-Crafts catalyst, it is preferred to use one which is sufficiently soluble in the hydrogenated naphtha solvent that it can be used in desired concentration to effect polymerization. Aluminum chloride, boron fluoride, and some of the other commonly used Friedel-Crafts catalysts are not very soluble in hydrocarbons, and accordingly it is preferred to use aluminum bromide or other catalysts which do have good hydrocarbon solubility. A number of complexes of a Friedel-Crafts catalyst with an organic compound may be used such as complexes with dichloroethyl ether, anisole, etc.

The polymerization may be carried out at any temperature below 0° C., but is preferably below −40° C. (−40° F.) and better still at a temperature from −60 to −150° F. This lower temperature range is particularly desirable when its is intended to make a polymer of highest molecular weight, such as an isobutylene-isoprene synthetic rubber having a molecular weight of 20,000 to 200,000, preferably 30,000 to 150,000.

To make synthetic rubber by this process, it is generally desirable to use an isobutylene feed containing about 1 to 30% of a $C_{4-6}$ diolefin. The amount of the latter depends somewhat upon the particular diolefin used. For instance, with butadiene, the preferred concentration is about 20 to 30%, whereas with isoprene the preferred concentration is about 1 to 5%. In either case, the resulting copolymer contains about 1 to 10% of combined diolefin, the balance being isobutylene.

The amount of Friedel-Crafts catalyst to be used should generally be about 0.01 to 1.0% by weight based on the reactants, and this may be added as a solution of any desired concentration ranging from 0.01 to 2.0% in the hydrogenated naphtha. Although less desirable, it is possible to use a Friedle-Crafts catalyst, even such as aluminum chloride or boron fluoride dissolved in a lower alkyl halide such as methyl chloride but of course such a procedure involves difficulties of separating the methyl chloride from the hydrogenated naphtha used as diluent for the reactants, and also reduces the solubility of the high molecular weight synthetic rubber polymer in the hydrogenated naphtha.

The amount of reaction diluent to be used, i. e. hydrogenated naphtha, may vary according to a number of factors such as temperature of polymerization, diolefin content, molecular weight and Mooney viscosity desired for the polymer product, etc. but normally should be about 0.1 to 4.0 parts by wt. per 1 part of mixed reactants, preferably about 0.25 to 1.5 parts by wt. per part of reactants.

During the course of polymerization the polymer molecules grow very rapidly to a high molecular weight, and being still dissolved in the hydrogenated naphtha solvent, a great increase in viscosity occurs, and therefore, the amount of polymer formed, i. e. the per cent conversion, must not be permitted to become excessive. Usually, the conversion should be maintained within the range from about 3 to 20%, preferably 5 to 10%, based on the total amount of reactants used, in order to keep the reaction liquid at a readily flowable viscosity.

The following experimental data are given to show the advantages of using a hydrogenated naphtha as solvent as compared to an untreated naphtha, for the polymerization of a mixture of 98% of isobutylene and 2% by weight of isoprene. Various proportions of reaction monomers and naphtha diluent were used as indicated in the table herebelow. The catalyst used in both cases was a solution of 1.1% by weight of aluminum bromide dissolved in naphtha, in each case being the same kind of naphtha as used as reaction diluent. The hydrogenated naphtha used, a virgin close-cut naphtha (B. P. 200–240° F.) from a North Louisiana crude, was hydrogenated over Harshaw nickel at 400 p. s. i. g. (lbs. per square inch gauge) at 345° F. for 10 hours. The Harshaw nickel is a reduced nickel formed from commercially available material which upon reduction gives a catalyst said to consist of metallic nickel (about 70%) on kieselguhr (about 30%). The following tabulation gives inspection data on the naphtha before and after hydrogenation.

|  | Before Hydrogenation | After Hydrogenation |
|---|---|---|
| Gravity, °API | 58.6 | 60.5 |
| Specific Dispersion | 107.7 | 95.3 |
| Refractive Index | 1.41335 | 1.40610 |
| Wt. Percent Sulfur | .0004 | .0003 |
| Bromine Number | 0 | 0 |

These results indicate that aromatics in the naphtha were hydrogenated. The polymerization was carried out at −140° F.

The following table also shows the conversion in weight per cent obtained, and the polymer Mooney, which is a rough indication of molecular weight:

| Ex. | Feed Composition | | Untreated Naphtha, Conversion, Wt. Percent | Hydrogenated Naphtha | |
|---|---|---|---|---|---|
|  | Monomers, Wt. Percent | Naphtha, Wt. Percent |  | Conversion, Wt. Percent | Polymer Mooney |
| 1 | 90 | 10 | None | 5.6 | 57 |
| 2 | 85 | 15 | None | 3.4 | 54 |
| 3 | 75 | 25 | None | 6.5 | 52 |
| 4 | 65 | 35 | None | 5.2 | 46 |

As shown in the above table, substantially no polymerization took place at all when the untreated naphtha was used as reaction diluent; this is due to polymerization poisons present in the untreated naphtha. On the other hand, when the hydrogenated naphtha was used as reaction diluent, satisfactory polymer having a Mooney value ranging from 46 to 57 was obtained, with a per cent conversion ranging from 3.4 to 6.5. The polymer Mooney becomes somewhat reduced with increasing proportions of hydrogenated naphtha diluent; this is probably due to the general dilution effect, and not to any polymerization poisons in the diluent.

In the above table, it is particularly remarkable that when untreated naphtha was employed as reaction diluent, no polymerization could be obtained, even though an excess of catalyst was employed, i. e. considerably more than was used in the case of the hydrogenated naphtha.

The polymer Mooney and conversions obtained in the above tests are suitable for subjecting the cold reaction liquid to heat exchange before separation of the polymer and solvent.

It has now been found possible, therefore, according to the present invention, to refine petroleum naphtha fractions by hydrogenation, and thereby remove or inactivate the constituents thereof which tended to poison the polymerization reaction. This invention therefore results in greatly improving the amount and the quality of polymer prepared in a solution polymerization process using a petroleum naphtha solvent both as reaction diluent and as catalyst solvent.

In another series of tests, the naphtha used was a virgin naphtha (B. P. 140° F.–190° F.) obtained from a mixed crude containing 80% South Louisiana crude and 20% Louisiana-Mississippi crude. Hydrogenation was carried out as in the other example (at 400 p. s. i. g., 345° F. for 10 hours using Harshaw nickel catalyst).

Inspection data are given below:

|  | Before Hydrogenation | After Hydrogenation |
|---|---|---|
| Gravity, ° API | 69.8 | 70.1 |
| Specific Dispersion | 102.7 | 97.2 |
| Refractive Index | 1.39196 | 1.39001 |
| Wt. Percent Sulfur | .0005 | .0004 |
| Bromine Number, cg./g | 0 | 0 |

Polymerizations using the above naphthas as diluents and catalyst (AlBr$_3$) solvents were carried out at —140° F. using a mixture of 98% isobutylene and 2% by weight of isoprene as monomers.

The following table shows the conversion and polymer Mooney viscosity.

| Ex. | Feed Composition | | Untreated Naphtha | | Hydrogenated Naphtha | |
|---|---|---|---|---|---|---|
|  | Monomers, Wt. Percent | Diluent, Wt. Percent | Conversion, Wt. Percent | Polymer Mooney | Conversion, Wt. Percent | Polymer Mooney |
| 5 | 80 | 20 | 5.0 | 56 | 6.3 | 70 |
| 6 | 70 | 30 | 3.7 | 30 | 4.1 | 54 |
| 7 | 60 | 40 | 2.6 | 10 | 8.1 | 40 |
| 8 | 50 | 50 | Nil | Nil | 10.5 | 27 |

These data show that hydrogenation of the naphtha resulted in a material of much better quality for use as reaction diluent. The fact that the hydrogenated diluent gives a higher Mooney viscosity polymer from a feed of a given monomer content is important because the more diluent the feed mixture contains, the greater the solubility of polymer in the feed. Thus with the hydrogenated naphtha, a polymer of a given Mooney viscosity or molecular weight can be prepared using more diluent than can be used when the virgin unhydrogenated naphtha is employed as diluent.

It is believed that the hydrogenation accomplishes several things.

1. Saturation of aromatics—aromatics are indicated to be slight poisons in the butyl reaction.
2. Removal or reduction of sulfur compounds.
3. Removal of trace nitrogen compounds.
4. Possibly removal of trace oxygenated compounds.
5. Saturation of olefinic compounds if present.

All the latter four of the above type compounds are probably, more or less, poisons for butyl polymerization. Sulfur compounds, some oxygenated compounds and some nitrogen containing compounds are believed to be poisons for the isobutylene-diene synthetic rubber polymerization.

It is not intended that this invention be limited to the specific examples which have been given above merely for the sake of illustration, but only by the appended claims in which it is intended to claim all novelty inherent in the invention as well as all modifications coming within the scope and spirit of the invention.

What is claimed is:

1. In the process of polymerizing lower olefins comprising isobutylene with a Friedel-Crafts catalyst at temperatures below 0° C., in the presence of a solvent in which the resulting high molecular weight polymers are at least substantially soluble, the improvement consisting in using as reaction diluent during polymerization a hydrogenated petroleum naphtha having an initial boiling point at least as high as 100° F., and an end point not higher than about 400° F.

2. In the process of making synthetic rubber by polymerizing isobutylene in the presence of a minor amount of a diolefin of 4 to 6 carbon atoms, at a temperature below —60° F. in the presence of a Friedel-Crafts catalyst and in the presence of a reaction diluent, the improvement consisting in using as reaction diluent during polymerization a liquid hydrocarbon fraction obtained by nondestructive hydrogenation of a narrow cut petroleum naphtha having a boiling range within the approximate limits of 150 to 250° F., the resulting high molecular weight isobutylene-diolefin synthetic rubber molecules being at least substantially soluble in said hydrogenated naphtha at the polymerization reaction temperature.

3. In the process of preparing an isobutylene-isoprene synthetic rubber, the improvements comprising mixing isobutylene and isoprene and a diluent made by hydrogenating a petroleum naphtha fraction boiling from 200 to 240° F., consisting mainly of aliphatic and naphthenic hydrocarbons of 6 to 8 carbon atoms, and containing not more than 20% of aromatic hydrocarbons, in the presence of a hydrogenation catalyst at a pressure of 100 to 5,000 lbs. per square ainch gauge at a temperature of 100–600° F. to inactivate polymerization poisons in said naphtha, removing any residual hydrogenation catalyst from said hydrogenated naphtha, using a polymerization feed consisting of about 95 to 99% of isobutylene and 1 to 5% of isoprene and using about 0.1 to 4.0 parts by weight of hydrogenated naphtha per part by weight of said reactants, and polymerizing said reactants at a temperature of about —140° F. by means of a catalyst consisting of a solution of aluminum bromide dissolved in some of said same type of hydrogenated naphtha, until a conversion of about 3 to 10% is obtained.

4. Process according to claim 3 in which the cold polymerization reaction liquid is subjected to heat exchange with reactants and reaction diluent, and thereafter the polymer is separated from reaction diluent and unreacted reactants.

5. A composition comprising a high molecular weight olefin polymer comprising isobutylene at least substantially dissolved in a solvent consisting essentially of a hydrogenated petroleum naphtha.

6. A composition comprising a Friedel-Crafts catalyst at least partially dissolved in a hydrogenated petroleum naphtha, the catalyst concentration being about 0.01–2.0%.

7. Process according to claim 1 in which the Friedel-Crafts catalyst is aluminum bromide.

8. A composition according to claim 6 in which the Friedel-Crafts catalyst is aluminum bromide.

References Cited in the file of this patent

UNITED STATES PATENTS

| 2,530,144 | Bannon | Nov. 14, 1950 |
| 2,561,729 | Dornte | July 24, 1951 |